(12) United States Patent
Kobayashi et al.

(10) Patent No.: US 7,194,374 B2
(45) Date of Patent: Mar. 20, 2007

(54) OPERATION GUIDE CUSTOMIZABLE MEASURING INSTRUMENT

(75) Inventors: Toru Kobayashi, Ibaraki (JP); Takuya Matsumoto, Sakai (JP)

(73) Assignee: Konica Minolta Sensing, Inc., Osaka (JP)

( * ) Notice: Subject to any disclaimer, the term of this patent is extended or adjusted under 35 U.S.C. 154(b) by 229 days.

(21) Appl. No.: 10/940,135

(22) Filed: Sep. 13, 2004

(65) Prior Publication Data

US 2005/0080588 A1 Apr. 14, 2005

(30) Foreign Application Priority Data

Sep. 18, 2003 (JP) ............................. 2003-325878

(51) Int. Cl.
*G06F 9/00* (2006.01)
(52) U.S. Cl. ..................................... 702/127; 715/705
(58) Field of Classification Search ............ 702/30–32, 702/108, 122, 119, 123, 127; 715/705, 707, 715/708, 709, 712, 713; 700/17, 83–85
See application file for complete search history.

(56) References Cited

U.S. PATENT DOCUMENTS

| | | | |
|---|---|---|---|
| 6,029,257 A * | 2/2000 | Palmer | 714/40 |
| 6,285,932 B1 | 9/2001 | De Bellefeuille et al. | 701/33 |
| 6,297,820 B1 | 10/2001 | Bloem et al. | 715/763 |
| 6,393,135 B1 | 5/2002 | Girardi et al. | 382/101 |
| 2003/0093164 A1 * | 5/2003 | Ebeert et al. | 700/83 |

FOREIGN PATENT DOCUMENTS

| | | |
|---|---|---|
| EP | 967463 A2 * | 12/1999 |
| GB | 2 315 140 A | 1/1998 |
| JP | 60-138426 | 7/1985 |
| JP | 06-262439 | 9/1994 |
| JP | 3016181 * | 7/1995 |
| JP | 2001-051762 | 2/2001 |
| JP | 2002-287864 | 10/2002 |
| JP | 2003-058303 | 2/2003 |
| JP | 2003-194572 | 7/2003 |

OTHER PUBLICATIONS

"Notice of Reasons for Rejection," (Office Action) for Japanese Patent Application No. 2003-325878, issued Sep. 20, 2005, 5 pages.

* cited by examiner

*Primary Examiner*—Manuel L. Barbee
(74) *Attorney, Agent, or Firm*—Brinks Hofer Gilson & Lione

(57) ABSTRACT

In an operation guide customizable measuring instrument constructed such that an operation guide for guiding an operation procedure of the instrument is displayable on a display section, and an instrument mechanism for measuring a physical quantity of an object to be measured is operable by an instrument control program equipped with a function which is callable in response to a predetermined command, the instrument has an operation guide storage which variably stores an operation guide file containing the operation guide and the command written in a markup language and a script language therein; an operation guide file processing part which displays the operation guide on the display section based on the operation guide file, and displays an instruction input section for accepting an instruction of an operator on the display section; and a command processing part which outputs the command to the instrument control program so as to call the function corresponding to the command in response to the instruction accepted by the instruction input section.

11 Claims, 11 Drawing Sheets

FIG. 2

```
<html>
<head>
<title>work</title>
<link rel="stylesheet" type="text/css" href="..main.css"/>
<style type="text/css"><!--
tr     {font-size:12px}
th     {padding:6px}
td     {text-align:left; padding:6px; line-height:140%}
td.photo   {text-align:center; padding:3px; line-height:140%}
--></style>
<script language="javascript">
function SampleMeasure(){
    try{
        var nsApp = new ActiveXobject("NewSoft.Application");       ～51
    }catch(e){
        nErr=e.number & 0xFFFF;
        alert("error"+ nErr +"\n"
         + "cannot control (operate, set) the software. \n"
         + "< measure > \n"
         + "1. check out whether the software is properly started up. \n"
         + "2. click the "update" button in the browser. \n"
         + "3. select "yes" button in the immediately preceding dialog box. ;
        nsApp="";
        return false;
    }
    var nsInstrument = nsApp.CreateInstrument ();
    nsInstrument. ManualAverage = false;  //manual average measurement " OFF "
    nsInstrument. Average = false;        //auto average measurement " OFF "   ～52
    var nsDataList = nsApp.CreateDataList ();
    var bRet = nsDataList. RegisterMeasure(SampleList) ;   //SampleList Sample List is a global constant
    var nErrCode = nsInstrument. GetErrorCode ();          53
    nsDataList="";
    nsInstrument="";
    nsApp="";
    if (bRet == false) {
        alert("error" + nErrCode + "\n" + "measurement failed!!");
        return false;
    }else{
        return true;
    }
}
</script>
</head>
</html>
```

```
<body>
<h2>
  <font size="3">
work
<br />
⌈ measure (only sample) ⌋
  </font>
</h2>                                               } 42
<div class="topic_none">
For measurement, place the sample in the sample aperture of the colorimeter,
as shown in the following picture, and click the "measure sample" button.
</div>                                              } 43
<br />
<div align="center">
<input type="button" value="measure sample" onclick="SampleMeasure()" style="width:
100px; height: 35px;" />                            ← 54
<br />                                              } 44
<br />
<table border="1">
<tr>
<td class="photo">
<img src="1mg/26PIC_Measure.JPG" alt="measure" border=0 />
</td>
</tr>
</table>                                            } 45
<br />
<hr class="separate" /><!-- -->
<form>
<div align="center">
<input type="button" value="<<return" onclick="JavaScript:history.back()" style="width:
85px; height: 25px;" />
</div>                                              } 46
</form>
</body>
</html>
```

40

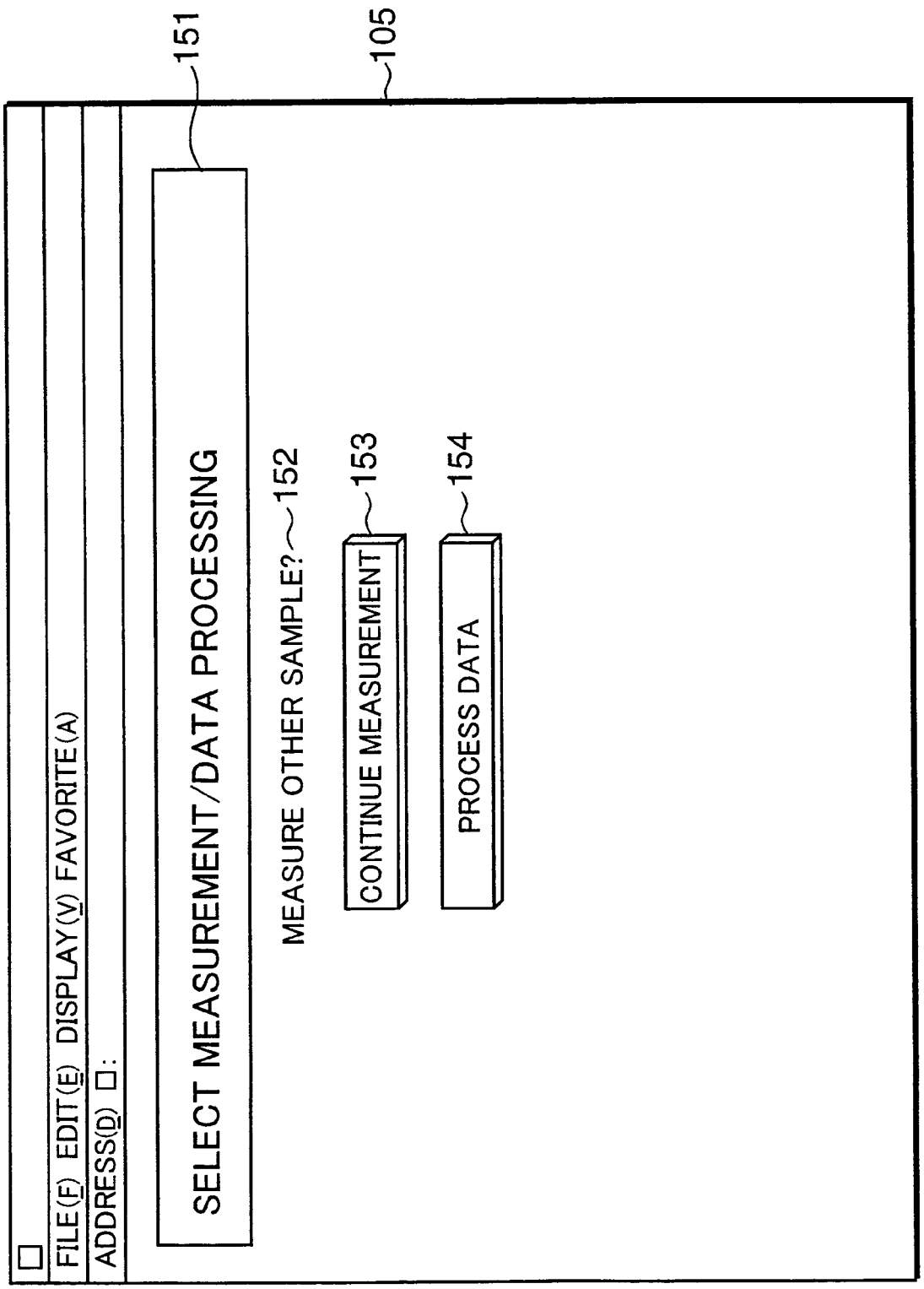

OPERATION GUIDE CUSTOMIZABLE MEASURING INSTRUMENT

This application is based on Japanese Patent Application No. 2003-325878 filed on Sep. 18, 2003, the contents of which are hereby incorporated by reference.

BACKGROUND OF THE INVENTION

1. Field of the Invention

The present invention relates to a measuring instrument for measuring a physical quantity of an object to be measured (hereinafter, called as "measurement sample"), and more particularly to an operation guide customizable measuring instrument that enables a user to execute a file containing an operation guide created with use of a versatile language, and enables to automatically operate the measuring instrument while making the operation guide displayable by execution of the operation-guide-containing file (hereinafter, called as "operation guide file").

2. Description of the Related Art

It is a customary practice to prepare a work procedure manual reciting a procedure for allowing any user to execute a predetermined work when the predetermined work is to be done with use of a measuring instrument. The user is guided to execute respective procedure items of the work in compliance with the work procedure manual. In the case where a beginner user or an unskilled user manipulates the instrument, the user searches for instruction messages on operations corresponding to the respective items through an instruction manual or on-line help, and executes the respective items based on the instruction messages.

Generally, the order of the procedure items recited in the work procedure manual is different one from the other, depending on the purpose of use. Furthermore, there is a case that the data processing method regarding measurement results may differ. For instance, if the measuring instrument is a colorimeter, items for measurement and a data processing method regarding measurement results to be used by an automotive vehicle manufacturer, and items for measurement and a data processing method regarding measurement results to be used by a consumer electronics manufacturer are different one from the other.

Considering functions of application softwares operable on a personal computer, some of the application softwares have a macro function. The macro function is a function of automatically causing the application software to execute a series of processing based on a macro program which is created by programming multiple functions of the application software in a macro language. As far as a predetermined work is executable merely with use of the function equipped in the application software, the predetermined work can be automated based on a macro program which is created by programming respective procedure items in a macro language. A system on which a user can operate a versatile personal computer efficiently and easily is disclosed, for example, in Japanese Unexamined Patent Publication No. 2003-58303. The system disclosed in the publication is a system of a data processor comprising operation input means and a display screen for displaying the status of the data processor. The system is operated by memorizing operating procedures and requirements relating to the operation as a sequence of macro steps in a macro program, so that a user can operate the data processor by execution of the macro program.

In handling the operation manual or on-line help, it is often the case that a beginner user or an unskilled user finds it difficult to grasp the operation corresponding to a procedure item required for executing a desired work, or finds difficulty in finding out an instruction message corresponding to the operation even if the user knows what he/she should do. Also, there is a problem that such a user may find difficulty in comprehending the correlation between the contents of the instruction message and the actual operation of the instrument. As mentioned above, it is difficult for the beginner user or the unskilled user to execute the work while actually manipulating the measuring instrument through the operation manual or on-line help.

In view of the fact that the procedure items of the work procedure manual and the data processing method are different one from the other, depending on the purpose of use, there is a need for customizing the measuring instrument according to the purpose of use. In addition to this need, there is a demand for rendering the terms exclusively comprehensive to the instrument manufacturer into user-friendly terms, so that the user can easily comprehend the operation manual or on-line help. In light of such a demand, there is an idea that creating a macro program according to the procedure items of the work procedure manual or the data processing method, and using the macro function may eliminate the above-mentioned drawbacks. However, since the conventional measuring instrument does not have such a macro function, it is difficult to apply this idea to the control program in the conventional measuring instrument. There is an idea of modifying the control program of the conventional measuring instrument and incorporating a macro function in the modified control program. However, in view of the requirement that the macro function be incorporated in the control program, the user must master the macro language for the control program, which is a hindrance to versatile use of the instrument. Furthermore, since the macro function itself does not play a role as an operation guide, it is necessary to provide additional means corresponding to the operation guide.

The system recited in the above patent publication is such that a user is allowed to execute the function of the application software, which has been conventionally executed by plural key inputs, merely with a single key input. The system, however, cannot solve the aforementioned various drawbacks all at once.

SUMMARY OF THE INVENTION

In view of the problems residing in the prior art, an object of the present invention is to provide an operation guide customizable measuring instrument that enables a user to execute an operation guide file created with use of a versatile language according to a desired purpose of use, and automatically operates the measuring instrument while making the operation guide displayable by execution of the operation guide file.

According to an aspect of the present invention, in an operation guide customizable measuring instrument constructed such that an operation guide for guiding an operation procedure of the instrument is displayable on a display section, and an instrument mechanism for measuring a physical quantity of an object to be measured is operable by an instrument control program equipped with a function which is callable in response to a predetermined command, the instrument comprises: an operation guide storage which variably stores an operation guide file containing the operation guide and the command written in a markup language and a script language therein; an operation guide file processing part which displays the operation guide on the display section based on the operation guide file, and displays an instruction input section for accepting an instruction of an operator on the display section; and a command processing part which outputs the command to the instrument control program so as to call the function corresponding to the command in response to the instruction accepted by the instruction input section.

According to another aspect of the present invention, in an operation guide customizable measuring instrument constructed such that an operation guide for guiding an operation procedure of the instrument is displayable on a display section, and an instrument mechanism for measuring a physical quantity of an object to be measured is operable by an instrument control program equipped with a function which is callable in response to a predetermined command, the instrument comprises: an operation guide storage which stores an operation guide file containing the operation guide and the command written in a markup language and a script language therein; an operation guide file processing part which displays the operation guide on the display section based on the operation guide file, and displays an instruction input section for accepting an instruction of an operator on the display section; a command processing part which outputs the command to the instrument control program so as to call the function corresponding to the command in response to the instruction accepted by the instruction input section; and an operation guide rewriting part which accepts a rewriting instruction with respect to at least one of the description written in the markup language and the description written in the script language based on an external instruction, rewrites the operation guide file stored in the operation guide storage based on the rewriting instruction for storing into the operation guide storage.

According to yet another aspect of the present invention, in a program product for causing a measuring instrument to perform a predetermined function, the measuring instrument is provided with a computer, and the computer is operable based on an instrument control program, and the program product causes the computer to perform a process comprising: reading an operation guide file containing an operation guide and a predetermined command written in a markup language and a script language; displaying the operation guide on a display section to realize the function of measuring a physical quantity of an object to be measured, the operation guide displayed on the display section including the operation guide indicating section and the operation accepting section; and calling a function described by the operation guide in response to an operator's manipulation on an operation accepting section based on descriptive contents in an operation guide indicating section, and in response to an output of the predetermined command to the instrument control program.

These and other objects, features and advantages of the present invention will become more apparent upon reading of the following detailed description along with the accompanying drawings.

BRIEF DESCRIPTION OF THE DRAWINGS

FIG. 2 is an illustration showing an example of a source code of HTML file (Part 1).

FIG. 3 is an illustration showing an example of a source code of HTML file (Part 2).

FIG. 11 is an illustration showing an operation guide screen relating to selection between measurement and data processing.

DETAILED DESCRIPTION OF THE PREFERRED EMBODIMENTS

Figure 1:
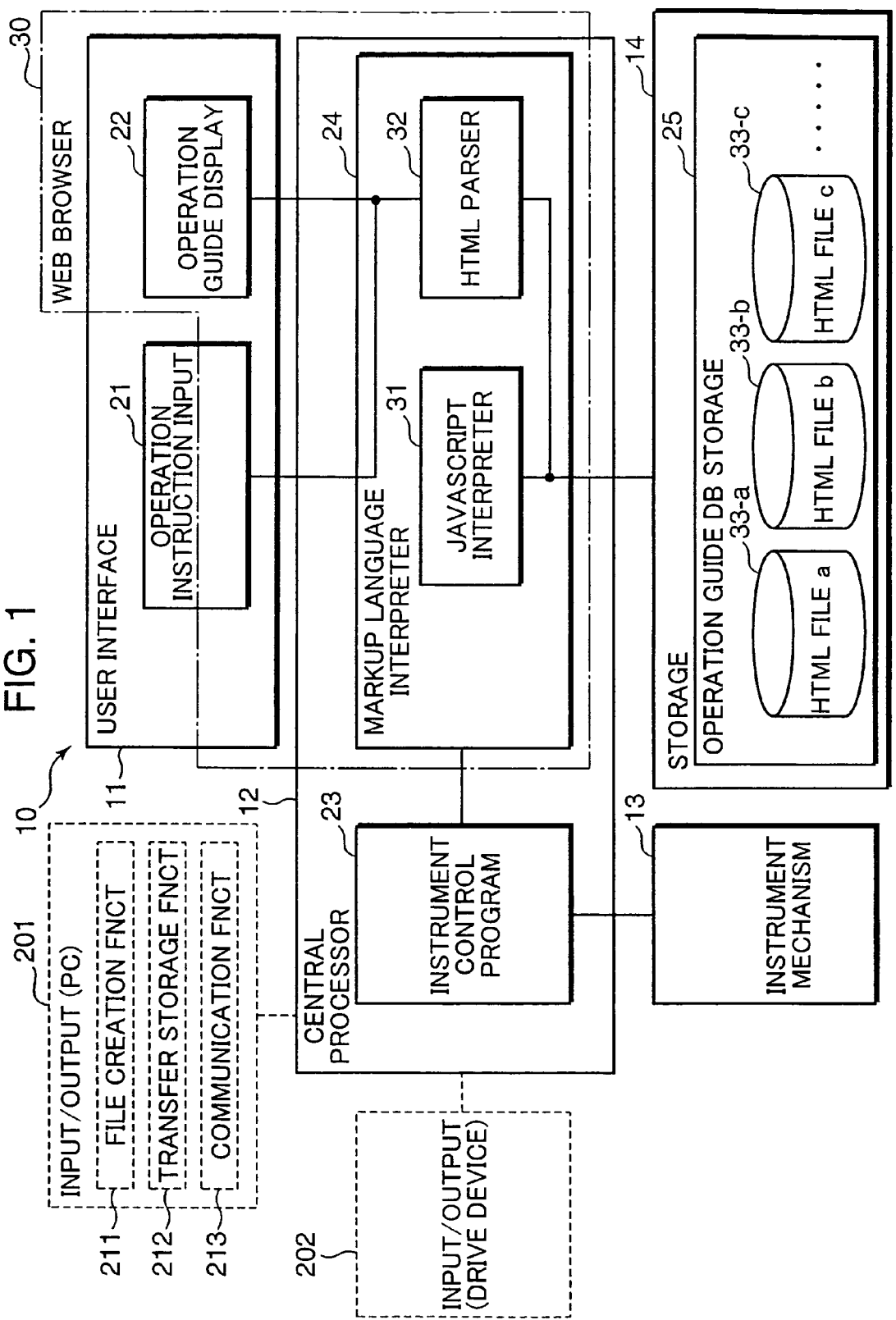
FIG. 1 is an illustration showing an arrangement of an operation guide customizable measuring instrument embodying the present invention.

In the following, a preferred embodiment of the present invention is described referring to the accompanying drawings. It should be noted that the like elements are identified by the like reference numerals throughout the drawings, and repeated description thereof will be avoided herein. First, an arrangement of the embodiment is described.

(Arrangement of the Embodiment)

An arrangement of the embodiment is described referring to FIGS. 1 through 4. Referring to FIG. 1, the operation guide customizable measuring instrument 10 (hereinafter, simply called as "instrument 10") includes a user interface 11, a central processor 12, an instrument mechanism 13, and a storage 14.

The user interface 11 is a device for allowing a user to send or receive information to or from the instrument 10. The user interface 11 includes an operation instruction input section 21 with which a user enters an operation instruction, and an operation guide display section 22 on which an operation guide is displayed. Generally, the user interface is roughly categorized into a character based user interface (CUI) which is primarily used for command input/message output based on characters, and a graphic user interface (GUI) which is primarily used for display using an image such as an icon or for mouse manipulation. In this embodiment, the GUI is employed as the user interface in light of the merit that the GUI makes the operation intuitive, and is user-friendly, although the quantity of graphics data to be processed is relatively large, which may give load to the central processor 12. Considering the use of the GUI, an input device such as a mouse is used as the operation instruction input section 21, and a display such as an LCD or an organic electroluminescence display is used as the operation guide display section 22 in the aspect of a hardware arrangement.

The central processor 12 includes an instrument control program section 23, and a markup language interpreting section 24. The instrument control program section 23 controls the instrument mechanism 13 by execution of an instrument control program. The markup language interpreting section 24 translates the source code written in a markup language and a script language, line by line, so that the central processor 12 can interpret and execute the source code. The central processor 12 controls respective operations of the parts constituting the instrument 10, and serves as a function block comprising a predetermined circuit, and a software which causes the circuit to perform a predetermined function. The central processor 12 includes a microprocessor, for example.

In this embodiment, an application software using an object linking and embedding (OLE) automation, which is a function of dynamically sending/receiving data between multiple application softwares under operation, is used as the instrument control program, considering the merit that the application software is capable of calling up a desired function from the markup language interpreting section 24. The markup language is a language for attaching, to a text file, information such as a text structure, design, and layout, with use of specific symbols. Examples of the markup languages are a hyper text markup language (HTML) utilized in creating a webpage, and an extensible markup language (XML) with which the user can extend an HTML tag. The script language is a language for writing a simple program called as a script. An example of the script language is JavaScript® (developed and provided by the Netscape Communications Corporation, U.S.A.), which is an object-oriented script language developed to add a simple function to the HTML.

In this embodiment, the markup language interpreting section 24 includes an HTML parser 32, and a JavaScript interpreter 31 in view of the fact that HTML is used as the markup language, and JavaScript is used as the script language. The HTML parser 32 translates the HTML, so that the central processor 12 can interpret the HTML and execute the HTML file. The JavaScript interpreter 31 translates the JavaScript, so that the central processor 12 can interpret the JavaScript and execute the JavaScript file. An application software generally called as a web browser which allows a user to browse web pages has a function to be implemented by the JavaScript interpreter 31 and a function to be implemented by the HTML parser 32. In view of this, in this embodiment, the markup language interpreting section 24, the operation instruction input section 21, and the operation guide display section 22 constitute a web browser 30, for example, in the aspect of a software arrangement. The above functions are realized by executing the web browser 30. Examples of the web browser 30 are Netscape Navigator (developed and provided by the Netscape Communications Corporation, U.S.A.) and the Internet Explorer (developed and provided by the Micro Soft Corporation, U.S.A.). The HTML parser 32 is an example of the operation guide file processing part of the present invention, and the JavaScript interpreter 31 is an example of the command processing part.

The instrument mechanism 13 includes a mechanical section and a circuit for measuring a physical quantity of a measurement sample. For instance, if the instrument 10 is a colorimeter, the instrument mechanism 13 includes a light source, a light receiving element which receives light for photoelectric conversion, an optical assembly which guides the light from the light source toward a measurement sample, and guides the light reflected from and/or transmitted through the measurement sample toward the light receiving element, a computation circuit which computes chroma, brightness or the like based on the output from the light receiving element, and a display device which displays the computation result outputted from the computation circuit as information relating to colors or the like. The instrument mechanism 13 is controlled and activated by the instrument control program section 23.

The storage 14 includes an operation guide database storage section 25 (hereinafter, called as "operation guide DB storage section 25") which stores an operation guide HTML file 33 (namely, plural operation guide HTML files a33-a, b33-b, c33-c, . . . ), as well as various programs (not shown) for activating the instrument 10, such as the instrument control program, data necessary for execution of the respective programs, and data (not shown) that has been generated during or after the program execution. The storage 14 includes a hard disc drive which is built in the instrument 10 or connected with the instrument 10 via a cable or a like drive, and a compact disc recordable (CD-R) drive. The respective programs and data stored in the storage 14 are read by the central processor 12 for execution. Further, more efficient execution is enabled if the central processor 12 is equipped with a buffer such as a random access memory (RAM), that is, a volatile memory device which temporarily stores data, or an electrically erasable programmable read only memory (EEPROM), that is, a rewritable non-volatile memory device.

The operation guide HTML file 33 is a text file of source code in the operation guide program which is embedded with an operation guide and written in HTML or JavaScript for execution of a series of procedure items to realize a predetermined work. Since the operation guide HTML file 33 is writable in HTML or JavaScript having versatility, the operation guide HTML file 33 is easily creatable by the user. With this arrangement, the user can create the operation guide HTML file 33 in accordance with the procedure items of the work procedure manual or the data processing method, which is different one from the other, depending on the purpose of use, and can store/rewrite the operation guide HTML file 33 in the operation guide DB storage section 25 of the storage 14 by means of an input/output unit shown by the dashed line in FIG. 1. Examples of the input/output unit are: a personal computer (PC) 201 comprising a file creation functioning part 211 which functions to create the operation guide HTML file 33, a communication functioning part 213 which functions to communicate with the instrument 10, and a transfer storage functioning part 212 which functions to transfer the created or rewritten operation guide HTML file 33 to the instrument 10 for storing into the operation guide DB storage section 25 of the storage 14; and a drive 202 for reading the operation guide HTML file 33 from a recording medium. The operation guide HTML file is created on the personal computer, and is stored in the recording medium. The recording medium includes, for example, a flexible disk, a CD-R, and a memory card. Alternatively, the input/output unit may acquire the operation guide HTML file 33 from an external source via a network, in place of using the recording medium.

The operation guide HTML file 33 is, for instance, a text file of source code as shown in FIGS. 2 and 3. Since it is difficult to show the entirety of the source code in one sheet of a drawing, the source code is shown such that the header and the body thereof are illustrated in FIGS. 2 and 3, respectively. Referring to FIG. 2, the header of the source code 40 includes a descriptive section 41 starting from "<script language="javascript">" to "</script>". The descriptive section 41 indicates a Javascript function Sample Measure( ), which is defined in JavaScript. Specifically, the descriptive section 41 indicates a processing procedure according to which the measurement sample is measured by the instrument mechanism 13 in response to a command to the instrument control program section 23. The descriptive section 41 includes a descriptive portion 51 used for generating an object to run the instrument control program, a descriptive portion 52 used for setting an average measurement mode of the instrument 10, and a descriptive portion 53 used for executing the measurement.

Figure 4:
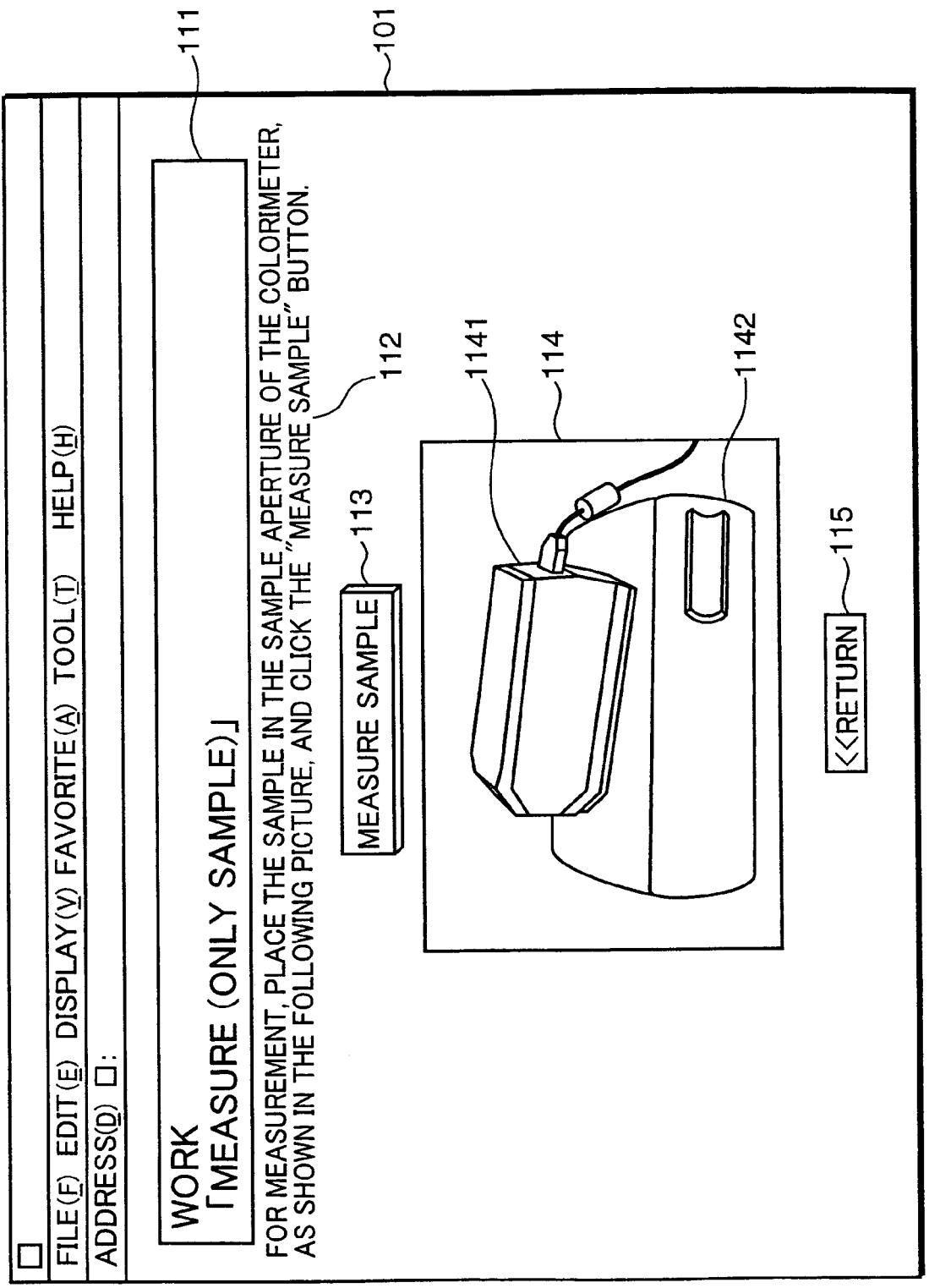
FIG. 4 is an illustration showing an example of a display screen displayed based on the HTML file shown in FIGS. 2 and 3.

When the text file of the source code 40 is loaded in the markup language interpreting section 24, and interpreted by the HTML parser 32 of the web browser 30, an operation guide screen 101, serving as the operation instruction input section 21 and the operation guide display section 22, is displayed on the user interface 11, as shown in FIG. 4. Specifically, on the operation guide screen 101 shown in FIG. 4, a title indicating section 111 is displayed on the basis of a descriptive section 42 in the body of the source code 40 shown in FIG. 3, an operation guide indicating section 112 is displayed on the basis of a descriptive section 43 in the body of the source code 40, a "MEASURE SAMPLE" button 113 shown in FIG. 4 is displayed on the basis of a descriptive section 44 in the body of the source code 40, and a reference image is displayed in a reference image display section 114 on the basis of a descriptive portion 45 in the body of the source code 40, and "<<RETURN" button 115 shown in FIG. 4 is displayed on the basis of a descriptive section 46 in the body of the source code 40. In the reference image display section 114, a measurement probe 1141 of the instrument 10, and a measurement sample 1142 are displayed. In the reference image display section 114, a contact state of the measurement sample 1142 with the measurement probe 1141 is depicted, for instance.

In this embodiment, since the graphics user interface is employed, the operation guide is displayable such that not only a descriptive message relating to the operation is displayed in the form of text on the operation guide indicating section 112 serving as the operation guide display section 22, but also a status of the operation is displayed as an image in the reference image display section 114. The "MEASURE SAMPLE" button 113 and the "<<RETURN" button 115 are displayed as the operation instruction input section 21.

As is obvious from a descriptive portion 54 of the description section 44 indicating "<input type="button" value="measure sample"onclick="SampleMeasure ( )" . . . >", when a mouse cursor is placed on the "MEASURE SAMPLE" button 113, and the "MEASURE SAMPLE" button 113 is clicked, the JavaScript function SampleMeasure( ) defined in the descriptive section 41 is executed, and a command is outputted to the instrument control program section 23 to cause the instrument mechanism 13 to measure the measurement sample. One or more operation guide HTML file 33 is stored in the operation guide DB storage section 25 depending on the purpose of use.

Next, an operation of the embodiment is described.

(Operation of the Embodiment)

Figure 5B:
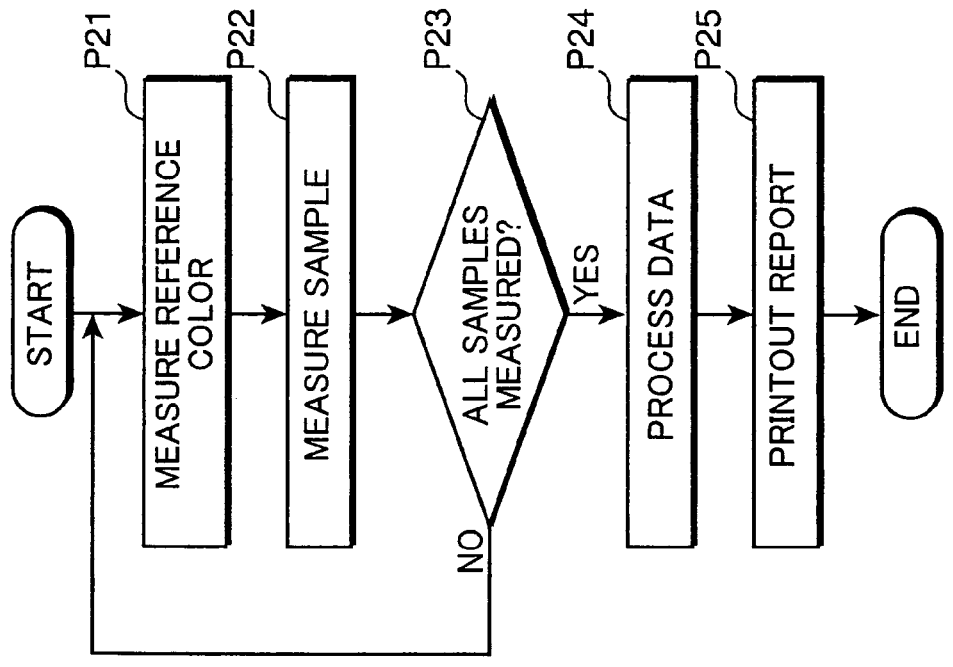
FIGS. 5A and 5B are flowcharts showing a work procedure manual.
Figure 5A:
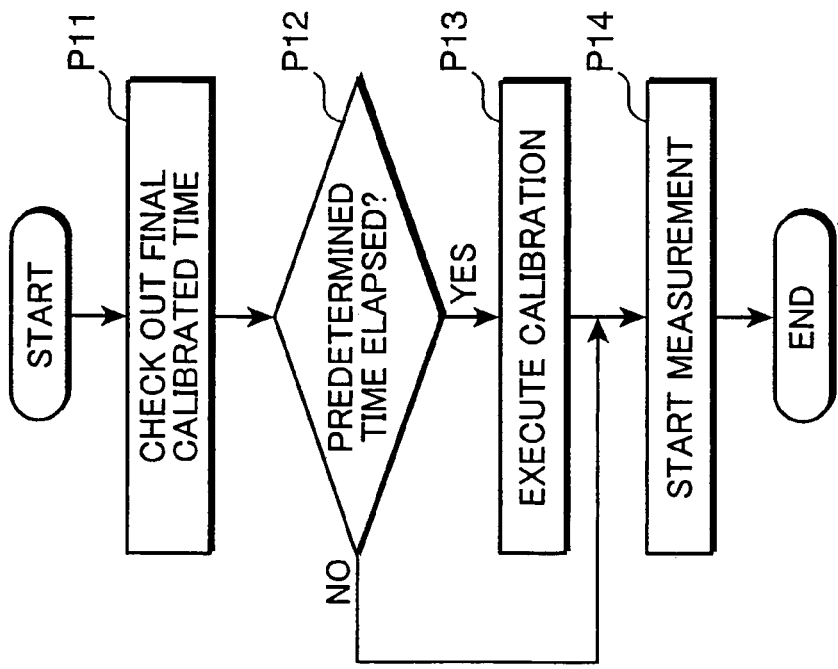

The self-operated operation-guide-displayable instrument 10 can be customized according to the purpose of use when the user optionally creates the operation guide HTML file 33. In this section, an operation of the instrument 10 is described by taking an example that the instrument 10 is a colorimeter, and that the user performs the work procedure described in the work procedure manual as shown in FIGS. 5A and 5B. The instrument 10 as the colorimeter is further provided with a printing section for printing data on a sheet in addition to the aforementioned elements. The instrument control program of the colorimeter is provided with a time holding function of holding a final calibrated time, a data processing function of computing various statistic data such as histograms, average values, variances, standard deviations, and correlation coefficients by implementing data processing with respect to measurement results, and a printing function of printing the measurement results and results on data processing by the printing section.

FIG. 5A is a flowchart showing the work procedure manual in the case where calibration of the calorimeter is performed, and FIG. 5B is a flowchart showing the work procedure manual in the case where measurement of the sample is performed. An operation from calibration to measurement is described referring to FIGS. 6 through 11, as well as FIGS. 5A and 5B.

The calibration of the colorimeter is as follows. As shown in FIG. 5A, first, the final calibrated time is checked out (Step P11, process 11), and it is judged whether a predetermined time has elapsed from the final calibrated time (Step P12). If it is judged that the predetermined time has elapsed (YES in Step P12), calibration is executed (Step P13), and thereafter, measurement is started (Step P14). On the other hand, if it is judged that the predetermined time has not elapsed (NO in Step P12), measurement is started while skipping calibration (Step P14).

The user creates an operation guide HTML file 33 used for calibration (hereinafter, called as "operation guide HTML file a33-a"), an operation guide HTML file 33 used for displaying an operation guide screen relating to calibration (hereinafter, called as "operation guide HTML file b33-b"), and an operation guide HTML file 33 used for displaying an operation guide screen relating to measurement (hereinafter, called as "operation guide HTML file c33-c"), with use of HTML and JavaScript, so that the user as well as the other user (e.g., an employee of a corporation or a company if the user is a corporation or company) can easily and securely execute the calibration of the colorimeter.

The operation guide HTML file a33-a is, for example, a text file of source code which has been programmed in JavaScript such that the final calibrated time be acquired from the instrument control program of the colorimeter, and that the time elapsed from the final calibrated time be computed in response to user's instruction to start a series of operations, and programmed in HTML such that the operation guide screen for calibration be displayed on the user interface 11 if the elapsed time exceeds the predetermined time, whereas the operation guide screen for measurement be displayed on the user interface 11 if the elapsed time is equal to or shorter than the predetermined time.

The operation guide HTML file b33-b used for displaying the calibration operation guide screen is, for example, a text file of source code which has been programmed in HTML such that the title (caption or headline) of the calibration operation guide screen be displayed, programmed in HTML such that a message for guiding the operation procedure of the calorimeter in calibration be displayed in the form of text, programmed in HTML such that the "CALIBRATE" button 123, which allows the user to input an instruction to execute the calibration, be displayed, programmed in HTML such that a program in JavaScript, which causes the instrument control program of the colorimeter to execute calibration in response to click on the "CALIBRATE" button 123, be executed, programmed in HTML such that the measurement operation guide screen be displayed on the user interface 11 after the calibration, programmed in HTML such that the "<<RETURN" button 115, which allows the user to input an instruction to return the on-screen image displayed on the user interface 11 back to the preceding one, be displayed, and programmed in HTML such that a program in JavaScript, which causes the preceding screen to be displayed on the user interface 11 in response to click on the "<<RETURN" button 115, be executed.

The operation guide HTML file c33-c is, for example, a text file of source code which has been programmed such that the title of the measurement operation guide screen be displayed, programmed in HTML such that a message for guiding the operation procedure of the calorimeter in measurement be displayed in the form of text, programmed in HTML such that a "MEASURE" button, which allows the user to input an instruction to execute the measurement, be displayed, and programmed in HTML such that a program in JavaScript, which causes the instrument control program of the calorimeter to execute measurement in response to click on the "MEASURE" button, be executed.

After creation of the operation guide HTML file a33-a used for calibration, the operation guide HTML file b33-b used for displaying the calibration operation guide screen, and the operation guide HTML file c33-c used for displaying the measurement operation guide screen, the user stores these HTML files a33-a, b33-b, and c33-c in the operation guide DB storage section 25 of the colorimeter.

Figure 6:
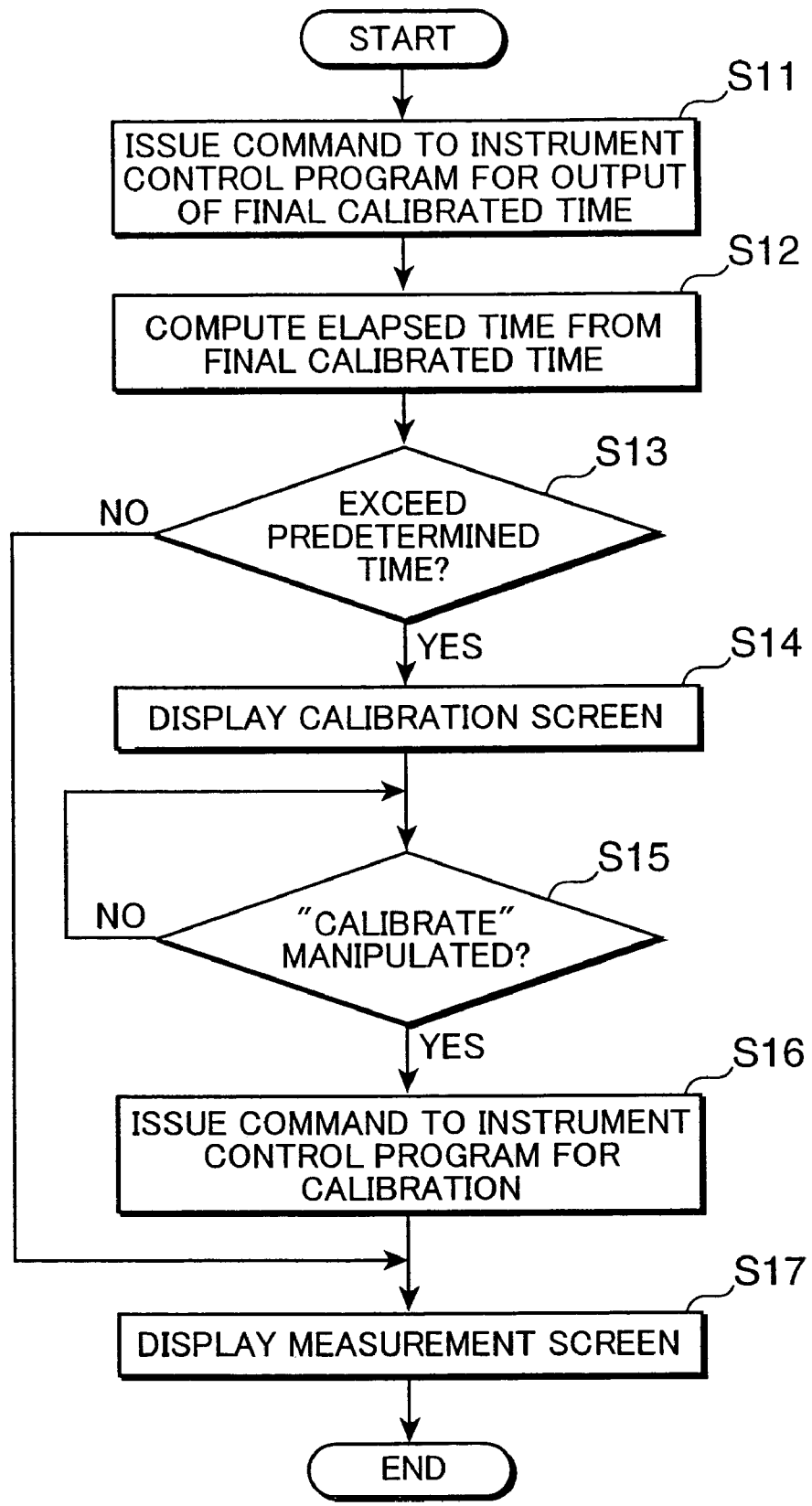
FIG. 6 is a flowchart showing an operation of the instrument in the case where an operation guide file corresponding to calibration of a colorimeter as the instrument is executed.

Referring to FIG. 6, for instance, in response to user's instruction to start a series of calibrating operations, the central processor 12 reads the operation guide HTML file a33-a out of the operation guide DB storage section 25, and the markup language interpreting section 24 translates the source code of the operation guide file HTML file a33-a, line by line, whereby a command is issued to the instrument control program section 23 of the calorimeter for output of the final calibrated time (Step S1). Upon receiving the command, the instrument control program section 23 outputs the final calibrated time to the markup language interpreting section 24.

In response to the command, the markup language interpreting section 24 computes the elapsed time from the final calibrated time (Step S12), and judges whether the computed elapsed time exceeds the predetermined time (Step S13). If it is judged that the elapsed time does not exceed the predetermined time (NO in Step S13), the markup language interpreting section 24 reads the operation guide HTML file c33-c for execution to display the measurement operation guide screen on the user interface 11 (Step S17). On the other hand, if it is judged that the elapsed time exceeds the predetermined time (YES in Step S13), the markup language interpreting section 24 reads the operation guide HTML file b33-b for execution to display the calibration operation guide screen on the user interface 11 (Step S14). In this way, the operation guide file a33-a can alter the operation guide HTML file 33 to be read by the markup language interpreting section 24, depending on the result of computation based on the output from the instrument control program section 23.

Figure 7:
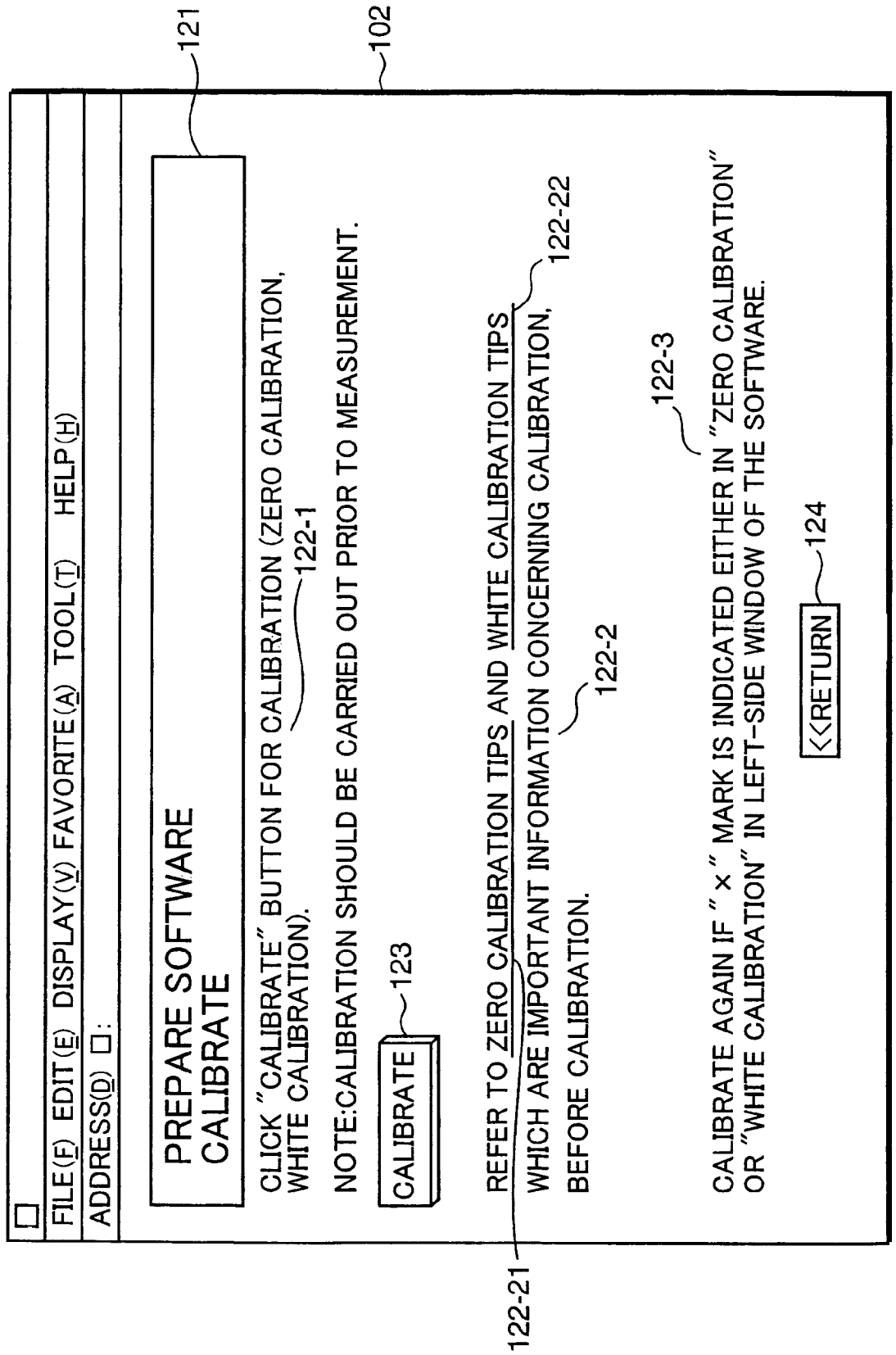
FIG. 7 is an illustration showing an operation guide screen relating to calibration.

The calibration operation guide screen 102 includes, for example, as shown in FIG. 7, a title indicating section 121 on which the title of the calibration operation guide screen 102 is displayed, an operation guide indicating section 122 (122-1, 122-2, 122-21, 122-22, 122-3) on which a message for guiding the operation procedure in calibration is displayed in the form of text, the "CALIBRATE" button 123 with which the user is allowed to input an instruction to execute calibration, and a "<<RETURN" button 124 with which the user is allowed to input an instruction to return the on-screen image displayed on the user interface 11 to the preceding one. Here, the operation guide indicating section 122-1 displays a message or a note explaining a specific operation in executing calibration, such as "Click the "CALIBRATE" button for calibration (zero calibration, white calibration). Note: Calibration should be carried out prior to measurement.". The operation guide indicating section 122-2 displays reference information in executing calibration, such as "Refer to zero calibration tips and white calibration tips, which are important information concerning calibration, before calibration." A hyperlink is established, so that clicking the "zero calibration tips" 122-21 or the "white calibration tips" 122-22 causes the page providing the desired information to be displayed. The operation guide indicating section 122-3 displays a message explaining a specific operation after execution of the calibration, such as "Calibrate again if "X" mark is indicated either in "zero calibration" or "white calibration" in the left-side window of the software".

Referring to measurement of the sample, as shown in FIG. 5B, after measurement of the reference color (Step P21), and measurement of the sample (Step P22), it is judged whether measurement with respect to all the samples has been completed (Step P23). If it is judged that measurement with respect to all the samples has not been completed (NO in Step P23), the process returns to Step P21 to measure the remaining sample(s). On the other hand, if it is judged that measurement with respect to all the samples has been completed (YES in Step P23), data regarding the measurement results are processed (Step P24), and the measurement results as well as the processing results are printed on a sheet as a report (Step P25).

The user creates an operation guide HTML file 33 used for displaying an operation guide screen relating to reference color measurement (hereinafter, called as "operation guide HTML file d33-d"), an operation guide HTML file 33 used for displaying an operation guide screen relating to sample measurement (hereinafter, called as "operation guide HTML file e33-e"), an operation guide HTML file 33 used for displaying an operation guide screen relating to selection between measurement and data processing (hereinafter, called as "operation guide HTML file f33-f"), and an operation guide HTML file 33 used for data processing (hereinafter, called as "operation guide HTML file g33-g") with use of HTML and JavaScript, so that the user as well as the other user can easily and securely execute sample color measurement with use of the calorimeter.

The operation guide HTML file d33-d is, for example, a text file of source code which has been programmed in HTML such that the title of the reference color measurement operation guide screen be displayed, programmed in HTML such that a message for guiding the operation procedure of the calorimeter in reference color measurement be displayed in the form of text, programmed in HTML such that a "MEASURE REFERENCE COLOR" button 133, which allows the user to input an instruction to execute the reference color measurement, be displayed, programmed in HTML such that a program in JavaScript, which causes the instrument control program of the colorimeter to execute reference color measurement in response to click on the "MEASURE REFERENCE COLOR" button 133, be executed, programmed in HTML such that a reference image for aiding comprehension of the message be displayed, and programmed in HTML such that the sample measurement operation guide screen be displayed on the user interface 11 upon completion of the reference color measurement.

The operation guide HTML file e33-e is, for example, a text file of source code which has been programmed in HTML such that the title of the sample measurement operation guide screen be displayed, programmed in HTML such that a message for guiding the operation procedure of the colorimeter in sample measurement be displayed in the form of text, programmed in HTML such that a "MEASURE SAMPLE"button 143, which allows the user to input an instruction to execute the sample measurement, be displayed, programmed in HTML such that a program in JavaScript, which causes the instrument control program of the colorimeter to execute sample measurement in response to click on the "MEASURE SAMPLE" button 143, be executed, programmed in HTML such that a reference image for aiding comprehension of the message be displayed, and programmed in HTML such that the measurement/data processing selection operation guide screen be displayed on the user interface 11 upon completion of the sample measurement.

The operation guide HTML file f33-f is, for example, a text file of source code which has been programmed in HTML such that the title of the measurement/data processing selection operation guide screen be displayed, programmed in HTML such that a message for guiding the operation procedure of the colorimeter in the measurement/ data processing selection operation guide screen be displayed in the form of text, programmed in HTML such that a "CONTINUE MEASUREMENT" button 153, which allows the user to input an instruction for continuation of measurement, be displayed, programmed in HTML such that a "PROCESS DATA" button 154, which allows the user to input an instruction for data processing, be displayed, programmed in HTML such that the reference color measurement operation guide screen be displayed on the user interface 11 in response to click on the "CONTINUE MEASUREMENT" button 153, and programmed in HTML such that the operation guide HTML file g33-g for data processing be executed in response to click on the "PROCESS DATA" button 154.

The operation guide HTML file g33-g is, for example, a text file of source code which has been programmed in JavaScript such that a command is outputted to the instrument control program of the colorimeter, so that the measurement result obtained by the sample measurement be computed depending on the data processing method selected by the user, and programmed in JavaScript such that a command is outputted to the instrument control program of the colorimeter, so that the measurement result and the computation result be printed.

Here, the data processing method selected by the user may be creation of a histogram and calculation of average values if the user uses the colorimeter to measure the color of a certain object. Alternatively, the data processing method may be calculation of average values, variances, standard deviations, and correlation coefficients if the user uses the colorimeter to measure the color of another object. In this way, the instrument (calorimeter) 10 according to the embodiment of the present invention makes it possible to create a program that can call up the function provided in the instrument control program necessary to execute a predetermined data processing to set the created program as the operation guide HTML file 33. With this arrangement, the measurement result can be processed according to the data processing method selected by the user.

After creation of the operation guide HTML file d33-d used for displaying the reference color measurement operation guide screen, the operation guide HTML file e33-e used for displaying the sample measurement operation guide screen, the operation guide HTML file f33-f used for displaying the measurement/data processing selection operation guide screen, and the operation guide HTML file g33-g used for data processing, the user stores these HTML files d33-d, e33-e, f33-f, and g33-g in the operation guide DB storage section 25 of the calorimeter.

Figure 8:
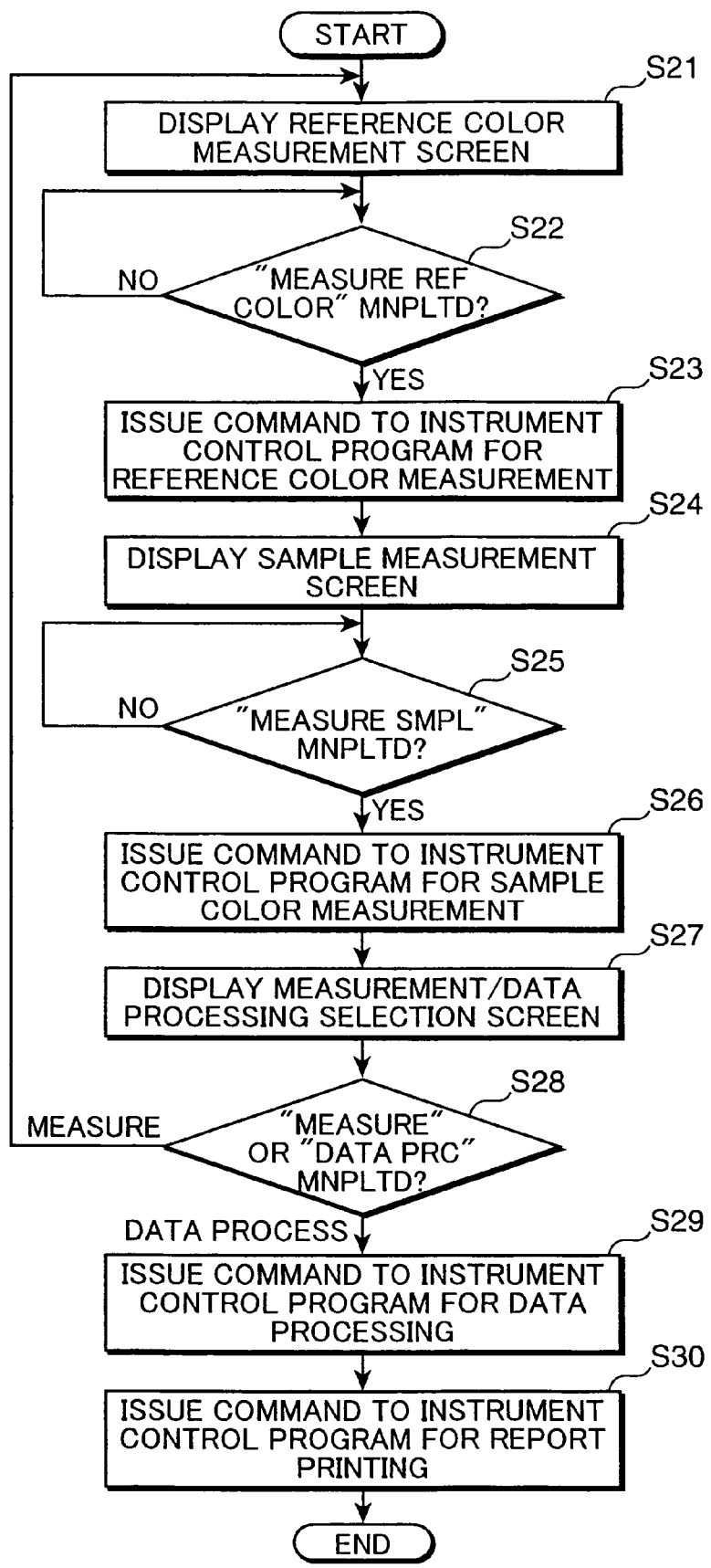
FIG. 8 is a flowchart showing an operation of the instrument in the case where an operation guide file corresponding to sample measurement is executed.

Referring to FIG. 8, in response to completion of calibration after startup of the calorimeter by the user, or in response to an instruction of reference color measurement by the user, the central processor 12 reads the operation guide HTML file d33-d out of the operation guide DB storage section 25, and the markup language interpreting section 24 translates the source code of the operation guide HTML file d33-d line by line to display the reference color measurement operation guide screen on the user interface 11 (Step S21).

Figure 9:
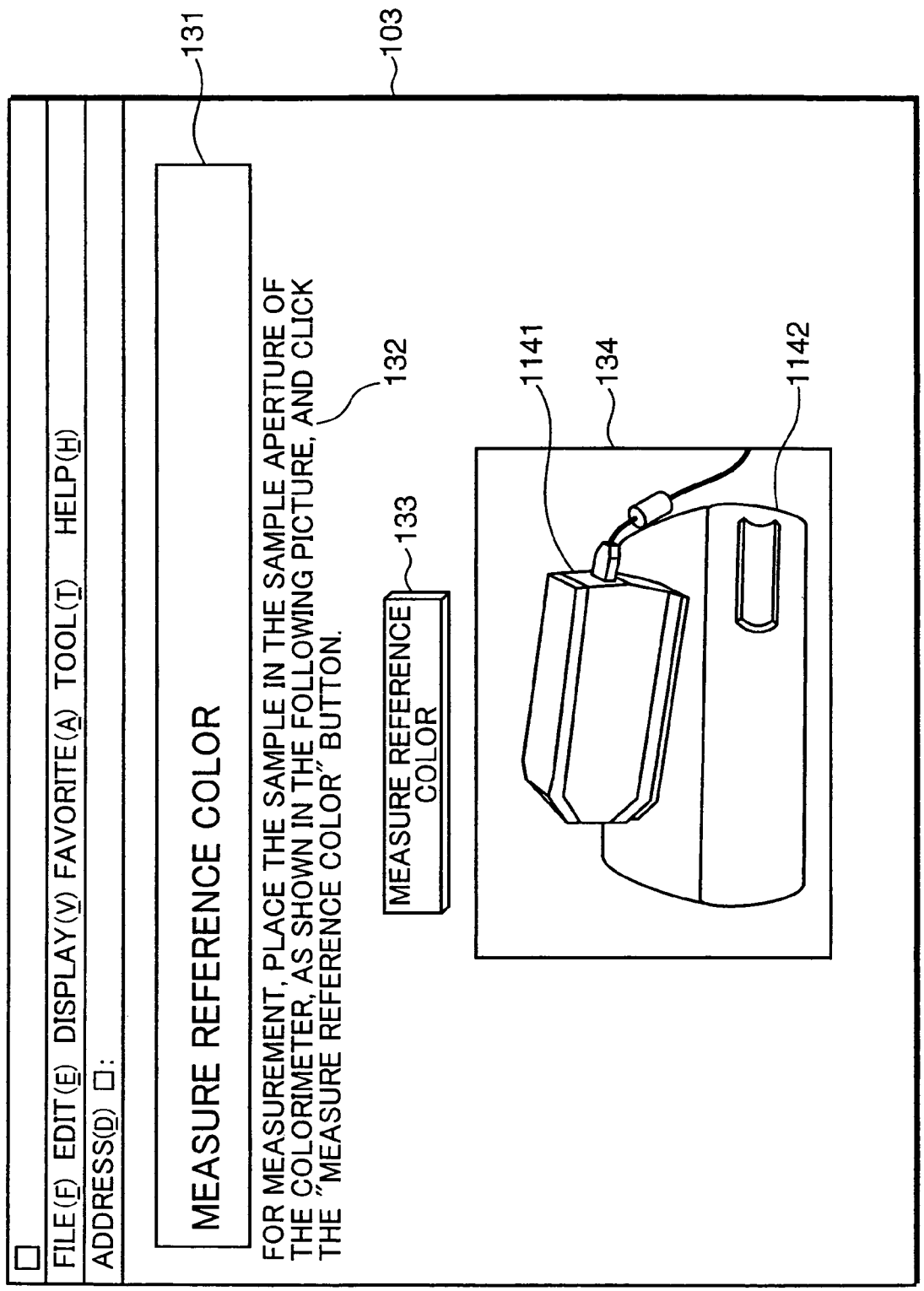
FIG. 9 is an illustration showing an operation guide screen relating to reference color measurement.

The reference color measurement operation guide screen 103 includes, for example, as shown in FIG. 9, a title indicating section 131 on which the title of the reference color measurement operation guide screen 103 is displayed, an operation guide indicating section 132 on which a message for guiding the operation in the reference color measurement is displayed, the "MEASURE REFERENCE COLOR" button 133 with which the user is allowed to input an instruction to start reference color measurement, and a reference image displaying section 134 for displaying a reference image to aid comprehension of the message.

Referring back to FIG. 8, the markup language interpreting section 24 judges whether the "MEASURE REFERENCE COLOR" button 133 has been manipulated through the operation instruction input section 21 such as a mouse (Step S22). If it is judged that the "MEASURE REFERENCE COLOR" button 133 has not been manipulated (NO in Step S22), the process waits. On the other hand, if it is judged that the "MEASURE REFERENCE COLOR" button 133 has been manipulated (YES in Step S22), the markup language interpreting section 24 issues a command to the instrument control program of the colorimeter to start reference color measurement (Step S23).

In response to the command, the instrument control program of the colorimeter measures the color (reference color) of a reference sample or the like by activating the instrument mechanism 13 of the colorimeter.

The markup language interpreting section 24 reads the operation guide HTML file e33-e out of the operation guide DB storage section 25, and translates the, source code of the operation guide HTML file e33-e line by line to display the sample measurement operation guide screen on the user interface 11 (Step S24). In this way, the operation guide HTML file d33-d used for displaying the reference color measurement operation guide screen makes it possible to cause the markup language interpreting section 24 to read the operation guide HTML file e33-e used for displaying the sample measurement operation guide screen.

Figure 10:
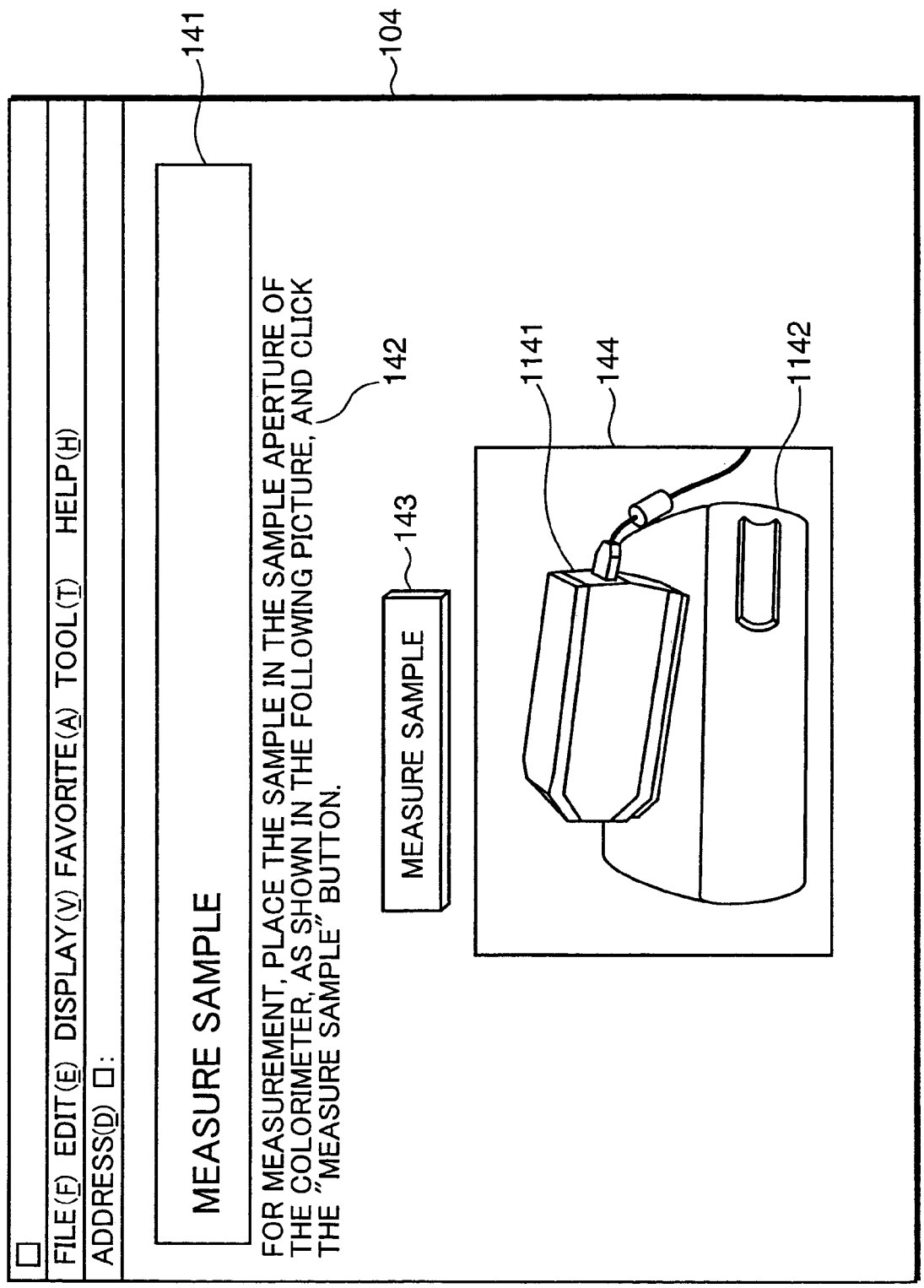
FIG. 10 is an illustration showing an operation guide screen relating to sample measurement.

The sample measurement operation guide screen 104 includes, for example, as shown in FIG. 10, a title indicating section 141 on which the title of the sample measurement operation guide screen 104 is displayed, an operation guide indicating section 142 on which a message for guiding the operation in the sample measurement is displayed, the "MEASURE SAMPLE" button 143 with which the user is allowed to input an instruction to start sample measurement, and a reference image displaying section 144 for displaying a reference image to aid comprehension of the message.

Referring back to FIG. 8, the markup language interpreting section 24 judges whether the "MEASURE SAMPLE" button 143 has been manipulated through the operation instruction input section 21 such as a mouse (Step S25). If it is judged that the "MEASURE SAMPLE" button 143 has not been manipulated (NO in Step S25), the process waits. On the other hand, if it is judged that the "MEASURE SAMPLE" button 143 has been manipulated (YES in Step S25), the markup language interpreting section 24 issues a command to the instrument control program of the colorimeter to start sample measurement (Step S26).

In response to the command, the instrument control program of the colorimeter measures the color of a measurement sample or the like by activating the instrument mechanism 13 of the colorimeter.

The markup language interpreting section 24 reads the operation guide HTML file f33-f out of the operation guide DB storage section 25, and translates the source code of the operation guide HTML file f33-f line by line to display the measurement/data processing selection operation guide screen on the user interface 11 (Step S27). In this way, the operation guide HTML file e33-e used for displaying the sample measurement operation guide screen makes it possible to cause the markup language interpreting section 24 to read the operation guide HTML file f33-f used for displaying the measurement/data processing selection operation guide screen.

The measurement/data processing selection operation guide screen 105 includes, for example, as shown in FIG. 11, a title indicating section 151 on which the title of the measurement/data processing selection operation guide screen 105 is displayed, an operation guide indicating section 152 on which a message for guiding the operation procedure in the measurement/data processing selection operation guide screen 105 is displayed, the "CONTINUE MEASUREMENT" button 153 with which the user is allowed to input an instruction to continue sample measurement, and the "PROCESS DATA" button 154 with which the user is allowed to input an instruction to start data processing.

Referring back to FIG. 8, the markup language interpreting section 24 judges whether the "CONTINUE MEASUREMENT" button 153 or the "PROCESS DATA" button 154 has been manipulated (Step S28). If it is judged that the "CONTINUE MEASUREMENT" button 153 has been manipulated (MEASURE in Step S28), the markup language interpreting section 24 reads the operation guide HTML file d33-d, and interprets the operation guide HTML file d33-d to display the reference color measurement operation guide screen 103. Thereby, the process resultantly returns to Step S21. On the other hand, if it is judged that the "PROCESS DATA" button 154 has been manipulated (DATA PROCESS in Step S28), the markup language interpreting section 24 reads the operation guide HTML file g33-g, and interprets the operation guide HTML file g33-g to process the data based on the measurement result with respect to the measurement sample. In this way, the operation guide HTML file f33-f used for displaying the measurement/data processing selection operation guide screen makes it possible to cause the markup language interpreting section 24 to read the operation guide HTML file d33-d used for displaying the reference color measurement operation guide or the operation guide HTML file g33-g used for data processing, depending on the selected button.

In response to the data process in Step S28, the markup language interpreting section 24 issues a command to the instrument control program of the calorimeter, so that the measurement result be processed in accordance with the data processing method selected by the user (Step S29). Thereafter, the markup language interpreting section 24 issues a command to the instrument control program of the colorimeter, so that the measurement result and the result of data processing be printed (Step S30).

As mentioned above, the operation guide customizable measuring instrument 10 according to the embodiment of the present invention is constructed such that the user can easily create an operation guide as the operation guide HTML file 33 with use of the HTML having versatility. This makes it possible to customize the instrument 10, so that the operation guide is variably displayable depending on the purpose of use. Furthermore, since the function of the instrument control program is callable in response to an external manipulation, and JavaScript can be incorporated into the operation guide HTML file 33, the instrument 10 can automatically perform the operation suitable for the purpose of use based on the user's instruction. Thus, the instrument 10 is customizable according to the purpose of use. In addition, a predetermined work can be realized with a less number of manipulations by programming a series of work items necessary for realizing the predetermined work as the operation guide HTML file 33.

In general, the routines executed to implement the embodiment of the invention, whether implemented as part of an operating system or a specific application, component, program, object, module or sequence of instructions will be referred to as "programs". The program comprises one or more instructions that are resident at various times in various memory and storage devices in a computer, and that cause the computer to perform the steps necessary to execute steps or elements embodying the various aspects of the invention.

The embodiment of the invention has and will be described in the context of functioning the computer and computer system. However, those skilled in the art will appreciate that various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

As mentioned above, an operation guide customizable measuring instrument is constructed such that an operation guide for guiding an operation procedure of the instrument is displayable on a display section, and an instrument mechanism for measuring a physical quantity of an object to be measured is operable by an instrument control program equipped with a function which is callable in response to a predetermined command. The instrument comprises: an operation guide storage which variably stores an operation guide file containing the operation guide written in a markup language and the command written in a script language therein; an operation guide file processing part which displays the operation guide on the display section based on the operation guide file, and displays an instruction input section for accepting an instruction of an operator on the display section; and a command processing part which outputs the command to the instrument control program so as to call the function corresponding to the command in response to the instruction accepted by the instruction input section.

Preferably, the instrument control program may include an object linking and embedding (OLE) automation; the markup language may be a hyper text markup language (HTML); the script language may be a JavaScript; the operation guide file processing part may be an HTML parser; and the command processing part may be a JavaScript interpreter.

Preferably, the operation guide file may be in plural number, and the one of the operation guide files may be callable of the other one of the operation guide files.

Preferably, the operation guide file may be in plural number, and the one of the operation guide files may be callable of the other one of the operation guide files depending on an output from the instrument control program.

Preferably, the instrument mechanism may be a calorimeter device which measures the color of the object to be measured.

With the above construction, the operation guide storage variably stores the operation guide file containing the operation guide written in the markup language and the predetermined command written in the script language. Thereby, the operation guide file can be created with use of the versatile language such as the markup language or the script language according to the purpose of use for storing into the operation guide storage. This arrangement enables to customize the measuring instrument according to the purpose of use. Furthermore, the operation guide file processing part displays the operation guide on the display section based on the operation guide file, and displays the instruction input section for accepting the user's instruction on the display section. With this arrangement, the user can easily manipulate the instrument while referring to the operation guide. Further, the operation guide file processing part can display the instruction input section which is designed to accept merely the instruction necessary for the operation guide. This arrangement makes it possible for the user to manipulate the instrument without or with less misguidance. Furthermore, the command processing part outputs the predetermined command to the instrument control program so as to call the function corresponding to the predetermined command in response to the instruction accepted by the instruction input section. Accordingly, the inventive instrument can automatically execute the necessary processing, which relieves the user of cumbersome operations.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An operation guide customizable measuring instrument constructed such that an operation guide for guiding an operation procedure of the instrument is displayable on a display section, and an instrument mechanism for measuring a physical quantity of an object to be measured is operable by an instrument control program equipped with a function which is callable in response to a predetermined command, the instrument comprising:

an operation guide storage which stores an operation guide file containing the operation guide and the command written in a markup language and a script language therein;

an operation guide file processing part which displays the operation guide on the display section based on the operation guide file, and displays an instruction input section for accepting an instruction of an operator on the display section;

a command processing part which outputs the command to the instrument control program so as to call the function corresponding to the command in response to the instruction accepted by the instruction input section; and an operation guide rewriting part which accepts a rewriting instruction with respect to at least one of a first description written in the markup language and a second description written in the script language based on an external instruction, rewrites the operation guide file stored in the operation guide storage based on the rewriting instruction for storing into the operation guide storage, wherein the external instruction is provided by a user who optionally creates the operation guide files written in the markup language and the script language in accordance with at least one procedure item of a work procedure manual or a data processing method.

2. The instrument according to claim 1, wherein the instrument control program includes an object linking and embedding (OLE) automation;

the markup language is a hyper text markup language (HTML);

the script language is a JavaScript;

the operation guide file processing part is an HTML parser; and the command processing part is a JavaScript interpreter.

3. The instrument according to claim 1, wherein the operation guide file is in plural number, and the one of the operation guide files is callable of the other one of the operation guide files.

4. The instrument according to claim 1, wherein the operation guide file is in plural number, and the one of the operation guide files is callable of the other one of the operation guide files depending on an output from the instrument control program.

5. The instrument according to claim 1, wherein the instrument mechanism is a colorimeter device which measures the color of the object to be measured.

6. A computer-readable medium having a program product stored thereon, the program product causing a measuring instrument to perform a predetermined function, the measuring instrument being provided with a computer, and the computer being operable based on an instrument control program, the program product which causes the computer to perform a process, the process comprising:

reading an operation guide file containing an operation guide and a predetermined command written in a markup language and a script language;

displaying the operation guide on a display section to realize the function of measuring a physical quantity of an object to be measured, the operation guide displayed on the display section including an operation guide indicating section and an operation accepting section;

calling a function described by the operation guide in response to an operator's manipulation on an operation accepting section based on descriptive contents in an operation guide indicating section, and in response to an output of the predetermined command to the instrument control; wherein, the operation guide file is rewriteable by rewriting at least one of a first description in the markup language and a second description written in the script language; and, the operation guide file is created by a user in accordance with procedure items of a work procedure manual or a data processing method.

7. The computer-readable medium according to claim 6, wherein the markup language is a hyper text markup language (HTML); and the script language is a JavaScript.

8. The computer-readable medium according to claim 6, wherein the operation guide file is in plural number, and the one of the operation guide files is callable of the other one of the operation guide files.

9. The computer-readable medium according to claim 6, wherein the operation guide file is in plural number, and the one of the operation guide files is callable of the other one of the operation guide files depending on an output front the instrument control program.

10. The computer-readable medium according to claim 6, wherein the measuring instrument measures the color of the object to be measured.

11. A computer-readable medium having a program product stored thereon, the program product causing a measuring instrument to perform a predetermined function, the measuring instrument being provided with a computer, and the computer being operable based on an instrument control program, the program product which causes the computer to function as:

operation guide reading and displaying means for reading an operation guide file containing an operation guide and a predetermined command written in a markup language and a script language, and for displaying the operation guide on a display section to realize the function of measuring a physical quantity of an object to be measured; and function calling means for calling a function described by the operation guide in response to an operator's manipulation on an operation accepting section based on descriptive contents in an operation guide indicating section, and in response to an output of the predetermined command to the instrument control program, the operation guide displayed on the display section including the operation guide indicating section and the operation accepting section, wherein the operation guide file is rewriteable by rewriting at least one of a first description written in the markup language and a second description written in the script language and wherein the operation guide file is created by the operator in accordance with procedure items of a work procedure manual or a data processing method.

* * * * *